(12) United States Patent
Folks et al.

(10) Patent No.: US 11,328,192 B1
(45) Date of Patent: May 10, 2022

(54) APP FOR DISPLAYING AN IDENTIFICATION CARD ON AN ELECTRONIC DEVICE

(71) Applicants: Martin Folks, Malvern, PA (US); Geoffrey Towell, West Chester, PA (US)

(72) Inventors: Martin Folks, Malvern, PA (US); Geoffrey Towell, West Chester, PA (US)

(73) Assignee: Mega Geometry, Inc., King of Prussia, PA (US)

( * ) Notice: Subject to any disclaimer, the term of this patent is extended or adjusted under 35 U.S.C. 154(b) by 0 days.

(21) Appl. No.: 16/801,213

(22) Filed: Feb. 26, 2020

Related U.S. Application Data (60) Provisional application No. 62/812,237, filed on Feb. 28, 2019.

(51) Int. Cl.
*G06K 19/06* (2006.01)
*G06K 7/14* (2006.01)
*H04L 29/06* (2006.01)

(52) U.S. Cl.
CPC ..... *G06K 19/06037* (2013.01); *G06K 7/1417* (2013.01); *H04L 63/083* (2013.01)

(58) Field of Classification Search
CPC ............ G06K 19/06037; G06K 7/1417; H04L 63/083; G06Q 50/265

USPC .......................................... 235/380; 705/325
See application file for complete search history.

(56) References Cited

U.S. PATENT DOCUMENTS

| | | | |
|---|---|---|---|
| 10,657,233 B1 * | 5/2020 | Wallbom ................. | G06K 9/18 |
| 10,755,265 B1 * | 8/2020 | Laureano-Osorio ........................ | |
| | | | G06Q 20/363 |
| 10,929,841 B1 * | 2/2021 | Kalaboukis ............ | G06Q 20/32 |
| 2015/0081538 A1 * | 3/2015 | Renard .................... | G06F 21/35 |
| | | | 705/41 |
| 2016/0294831 A1 * | 10/2016 | Borunda ............. | H04L 63/0807 |
| 2017/0076293 A1 * | 3/2017 | Cage ................. | H04L 63/0853 |
| 2017/0206374 A1 * | 7/2017 | Bostick ................... | G06F 21/35 |
| 2019/0332791 A1 * | 10/2019 | Mahalle ................ | G06F 21/602 |

\* cited by examiner

*Primary Examiner* — Suezu Ellis
(74) *Attorney, Agent, or Firm* — Joseph E. Maenner; Maenner & Associates, LLC (57) ABSTRACT

A non-transitory machine-readable storage medium, having encoded thereon program code is provided. When the program code is executed by a machine, the machine implements the following method for validating the identification of a person: receiving an input listing an identification-issuing entity from a first application; receiving an input of an identification number provided by the identification-issuing entity; displaying a picture of an identification card issued by the identification-issuing party; and saving the picture to a database associated with a user name on the identification card and the identification-issuing entity.

12 Claims, 10 Drawing Sheets

APP FOR DISPLAYING AN IDENTIFICATION CARD ON AN ELECTRONIC DEVICE

BACKGROUND OF THE INVENTION

Field of the Invention

The present invention relates to a system and method of electronically authenticating a person.

Description of the Related Art

People carry smart phones in preference to everything else, including identification. In response to this preference, products exist to bundle physical identifications with a cell phone, including protective cases with pockets and stick on pockets that attach to the phone. These devices, however, do not provide the convenience of credit card systems like ApplePay and SamsungPay.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Useful IDs need to be both easy to use and usable everywhere. These requirements present security challenges. The DI app makes digital IDs easy for users. First, it is designed to be issuer agnostic. Therefore, it can hold all a user's IDs. The app stores the permanent password for each ID in an encrypted space. To protect this store, whenever users bring the app to an active state, they would be asked to enter a password or pin. If fingerprint or other biometric identification is available on the device, the user need not even remember a password. Importantly, this is a single PIN for all IDs so it unlikely to be stored insecurely (i.e. on a piece of paper in a wallet).

The second requirement is that a digital ID be usable everywhere. This means it must be available, regardless of whether the displaying device is connected to the Internet. The DI app address this issue by caching the ID information it obtains every time it is able to access the Internet. Thus, when the app is unable to get a new copy of an ID, it is able to show an older copy. As with passwords, copies of the ID are stored in an encrypted space on the device.

Caching presents a secondary problem, namely that users can present out of date or otherwise invalid IDs. For instance, consider a terminated employee who retained their ID badge. Simple visual examination of the badge would not reveal that the employee had been terminated. For the DI app this terminated employee could do something similar. Specifically, they could disconnect their device from the Internet before displaying their ID. This would prevent the app from getting an update and force the use of the cached copy.) To address this security risk the DI app clearly indicates that the ID being displayed was not obtained in real-time from the ID issuer.

More, the validator runs on a separate device. The validator requires an Internet connection; hence it would immediately reveal this form of fraud.

In one embodiment, the present invention is a digital identification system that reduces or eliminates the need to carry hard copy identification cards or badges.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to FIGS. 1-10, a system 100 according to an exemplary embodiment of the present invention is used to provide a software-based system with which a user can securely store at least one identification on an electronic device, such as, for example, a cell phone. Exemplary identifications can include, but are not limited to, driver's licenses, school identifications, employment identifications, library cards, etc. System 100 includes a non-transitory machine-readable storage medium, having encoded thereon program code, wherein, when the program code is executed by a machine, and the machine implements a method for validating the identification of a person.

Security risks occur at 3 times with respect to system 100: obtaining an identification ("ID"), displaying the ID, and validating the ID. We cover each below. In addition, there is the issue of general security of the data. System 100 is designed so that the ID issuer owns and has total control over the IDs. System 100 requires two points of read-only access: first to obtain ID for presentation by system 100; and second, for ID validation by the Validator app. In addition, system 100 may (at the option of the ID issuer) present an interface that allows user to change their access password.

Obtaining an ID

Figure 1:
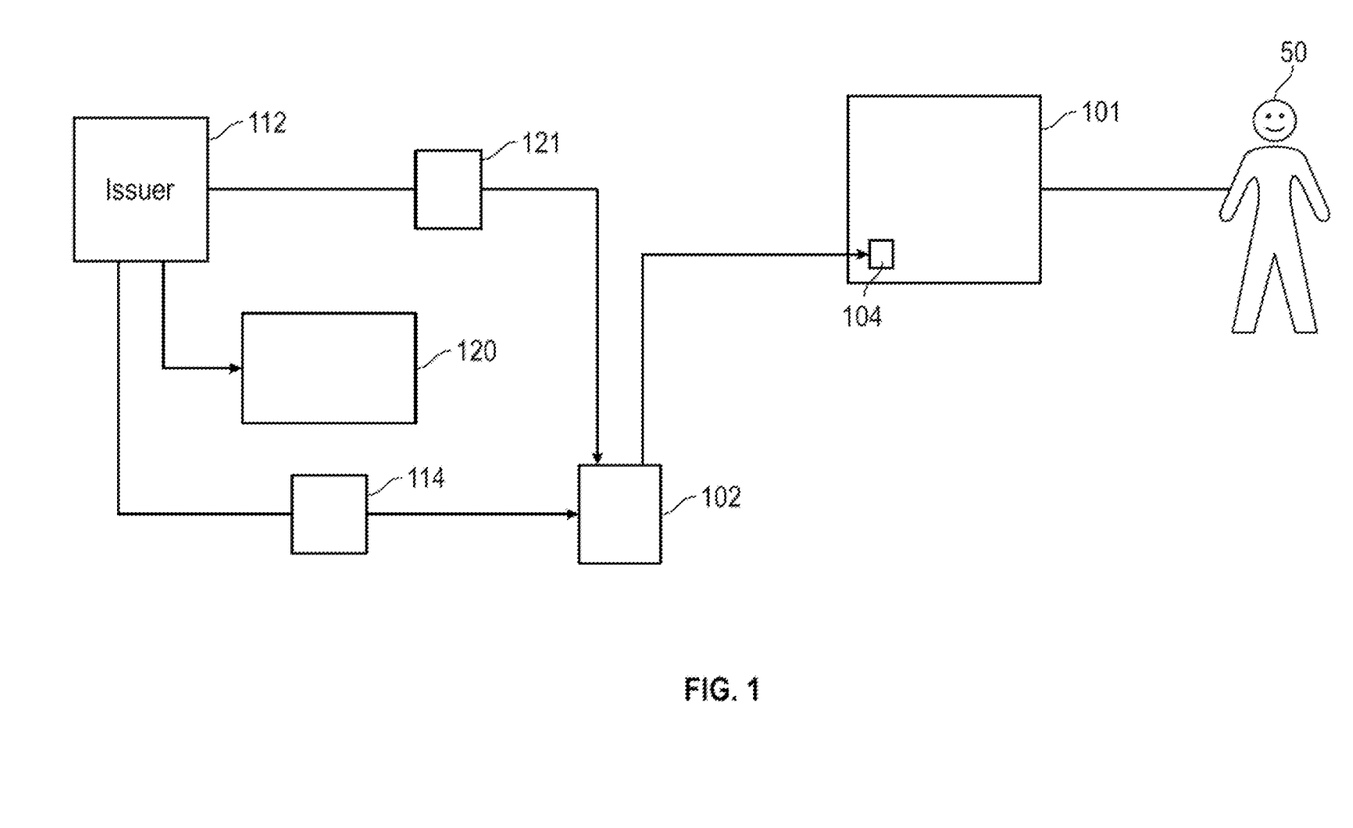
FIG. 1 is a schematic drawing of a personal identification system according to an exemplary embodiment of the present application.

At the time, a user registers for an ID, the ID issuer would give the user a temporary password for a digital ID. Like all temporary passwords, this password would be time limited (i.e., expires in 24 hours) and usage limited in the sense that it would only be used to set up a permanent password. Once the permanent password is set, it can be used to obtain a digital copy of the ID. System 100 stores the password and other information (e.g. license number) with a permanent password for each ID in an encrypted space (for instance, in the "keystore" on iPhone). Using that information and its internal knowledge of the access protocol for the ID issuer, system 100 communicates with the ID issuer's servers 120 to obtain a copy of the ID. We expect that most issuers will use common secure communication standards (e.g. https), but system 100 is designed to work with whatever protocol an ID issuer is most comfortable.

Displaying an ID

Useful IDs need to be both easy to use and usable everywhere. These requirements present security challenges. System 100 makes digital IDs easy for users. First, it is designed to be issuer agnostic. Therefore, it can hold all a user's IDs. System 100 stores the permanent password for each ID in an encrypted space. To protect this store, whenever users bring system 100 to an active state, they would need to enter a password or PIN. If fingerprint or other biometric identification is available on the device, the user need not even remember a password. Importantly, this is a single PIN for all IDs so it unlikely to be stored insecurely (i.e. on a piece of paper in a wallet). The second requirement is that a digital ID be usable everywhere. This means it must be available, regardless of whether the displaying device is connected to the internet. System 100 addresses this issue by caching the ID information it obtains every time it is able to access the internet. Thus, system 100 is unable to get a new copy of an ID, it is able to show an older copy. As with passwords, copies of the ID are stored in an encrypted space on the device.

Caching presents a secondary problem, namely that users can present out of date or otherwise invalid IDs. For instance, consider a terminated employee who retained their ID badge, Simple visual examination of the badge would not reveal that the employee had been terminated. For system 100, this terminated employee could do something similar. Specifically, they could disconnect their device from the internet before displaying their ID. This would prevent system 100 from getting an update and force the use of the cached copy.) To address this security risk system 100 clearly indicates that the ID being displayed was not obtained in real-time from the ID issuer. More, the validator—discussed next—runs on a separate device. The validator requires an internet connection; hence it would immediately reveal this form of fraud.

Validating an ID

The DI Validator app (hereafter referred to as DV) is a separate (second) app running on a separate device from the first app but associated with the first app, used to display the ID. The DV asks the ID issuer to send information about the user, allowing the DV user to confirm the ID of the person. As part of system 100, the DV App requires there be a digital encoding of the ID that is readable by the DV app. For instance, this could be a QR code. The digital encoding contains two parts, the ID issuer and the ID. Neither of these needs be, or should be, anything other than numbers. To use these numbers, the DV app holds a mapping from the ID issuer number to the site which the issuer maintains for validating IDs. This is first line of defense against fraud. Because the DV app knows the mapping from issuer ID to issuer location, it is not possible to simply direct the DV to bogus validation address. It is fairly trivial for interested parties for determine the validating site given an issuer ID (a little packet sniffing is all that would be required). However, it is difficult to use this knowledge fraudulently. The fake ID presenter does not control the DV app hence the fake ID presenter cannot stop the DV app from trying to go the correct site.

Of equal importance, is the ID identifier. In the simplest form this is simply the license number. With that and the issuer ID, the DV would be able to obtain a copy of the license (or whatever information the ID issuer provides). Using the license number, or any fixed number, opens a potential vulnerability with we call the "Borrowing your old brother's license" ploy. Specifically, Person A obtains an ID, Person A then takes screen shots of their ID and the QR code and provides those to person B. Person B then presents those images as being their own. This can easily be defeated by the ID issuer, Each time the ID issuer is asked by system 100 for a new copy of the ID, the issuer generates a unique code for the ID. That code is valid only until a newer code is generated (and/or for a limited time). Hence, the "older brother license" images are only briefly useful, if at all.

In an exemplary embodiment, a photo of user 50 is associated with the identification. In another exemplary embodiment, a bar code, a QR code, or other uniquely identifying visual icon is provided to uniquely identify user 50 to a third party, such as a human or an electronic reader (not shown).

An exemplary schematic of system 100 is shown in FIG. 1. System 100 can be provided to a cell phone 101 as a software application ("app") 102 that can be uploaded to cell phone 101 and accessed with a single click on an icon 104 on cell phone 101. Once app 102 is uploaded to cell phone 101, a user 50 can use app 102 to begin storing personal identification thereon.

At the time a user registers for an ID, the ID issuer would give the user a temporary password for a digital ID. Like all temporary passwords this password would be time limited (i.e., expires in 24 hours) and usage limited in the sense that it would only be used to set up a permanent password. Once the permanent password is set, it can be used to obtain a digital copy of the ID.

The DI app stores the password and other information (e.g. license number) permanent password for each ID in an encrypted space (for instance, in the "keystore" on iPhone). Using that information and its internal knowledge of the access protocol for the ID issuer, the DI app will communicate with the ID issuer's servers to obtain a copy of the ID. We expect that most issuers will use common secure communication standards (e.g. https).

Figure 2:
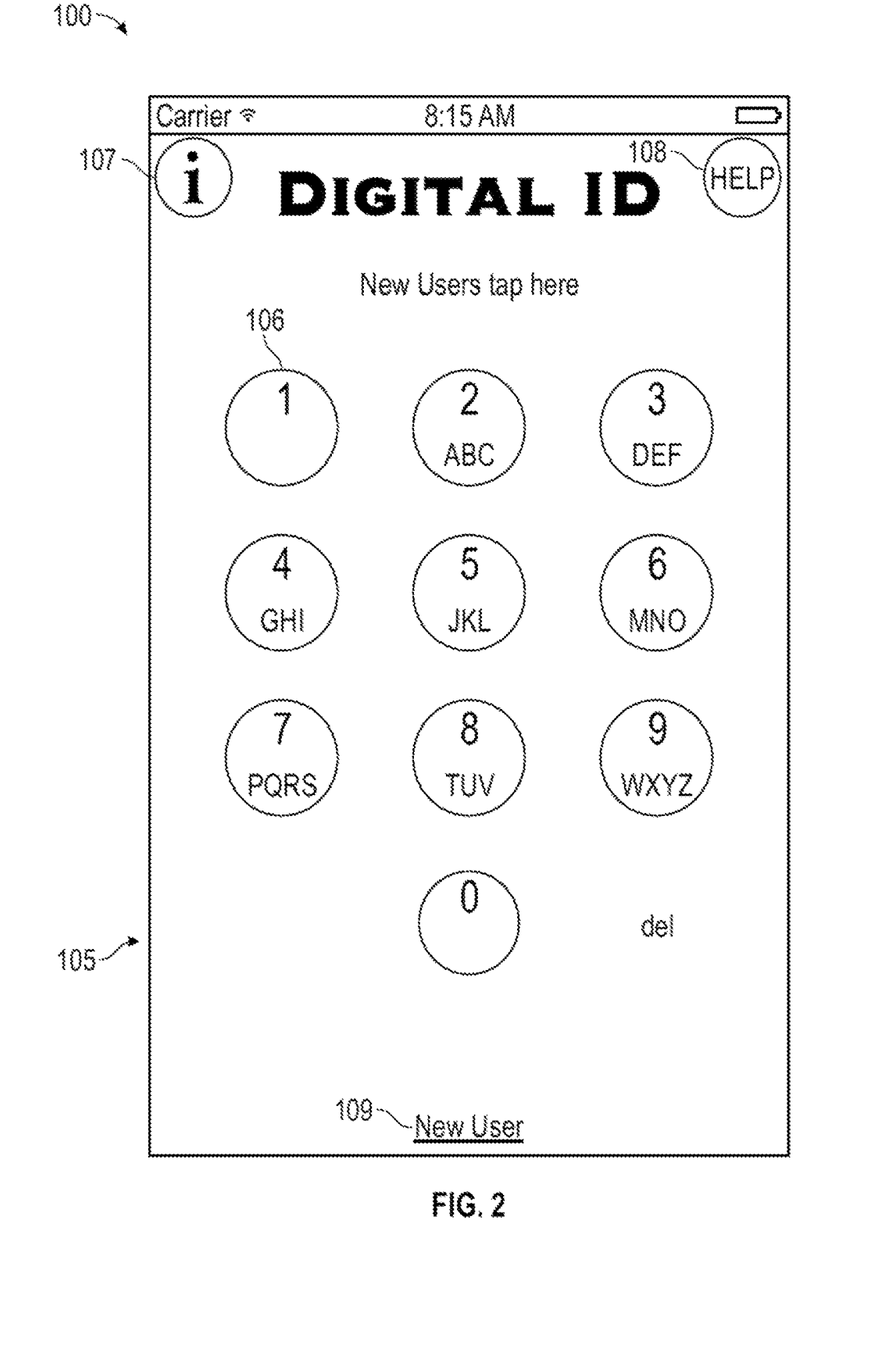
FIG. 2 is an exemplary Graphical User Interface ("GUI") of a "new User" screen for use with the system of FIG. 1.

An exemplary GUI 105 of a first page of first app 102 is provided in FIG. 2. GUI 105 provides a numeric keypad 106 on which a user 50 can input a personal identification number (PIN). While a numeric keypad 106 is shown, those skilled in the art will recognize that an alphabetical keypad, an alpha-numeric keypad, or other type of keypad can be used. An "Information" button 107 can be pressed to display information about system 100 such as, for example, the developer of system 100, the version number, and other similar types of information.

Figure 3:
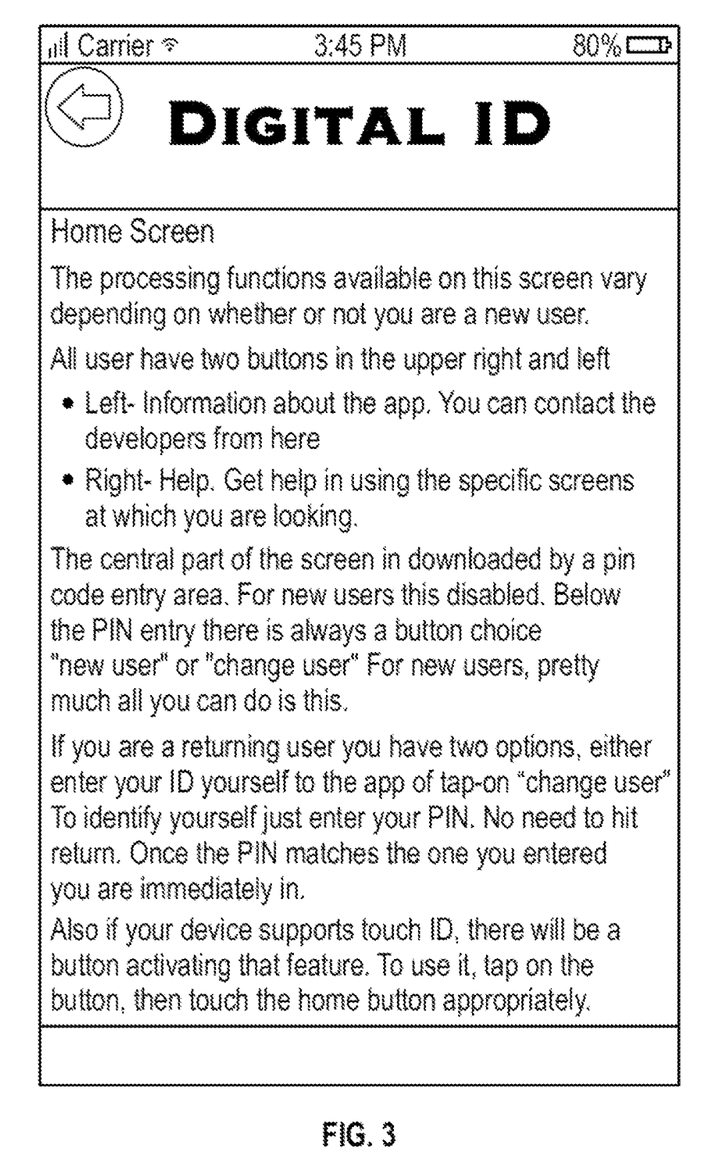
FIG. 3 is an exemplary GUI of use instructions for the system of FIG. 1.

GUI 105 can also provide a Help" button 108 that provides instructions for how to operate system 100. An exemplary screen shot of the instructions is shown in FIG. 3. Referring back to FIG. 2, a "New User" button 109 is also provided on GUI 105 to allow a new user to begin using system 100.

Prior to using system 100 for the first time, or adding a new identification, user 50 must obtain a password 110 from an issuer 112 of the identification (i.e., employer, school administrator, motor vehicle department, etc.). Password 110, along with an identification number 114 assigned to user 50 (i.e., employee badge number, student identification number, driver's license number, etc.) is used by system 100 to interact with a web site 120 run by issuer 112. Further, a photo 121 of user 50 or other visually identifying display is provided to system 100 by issuer 112.

Figure 4:
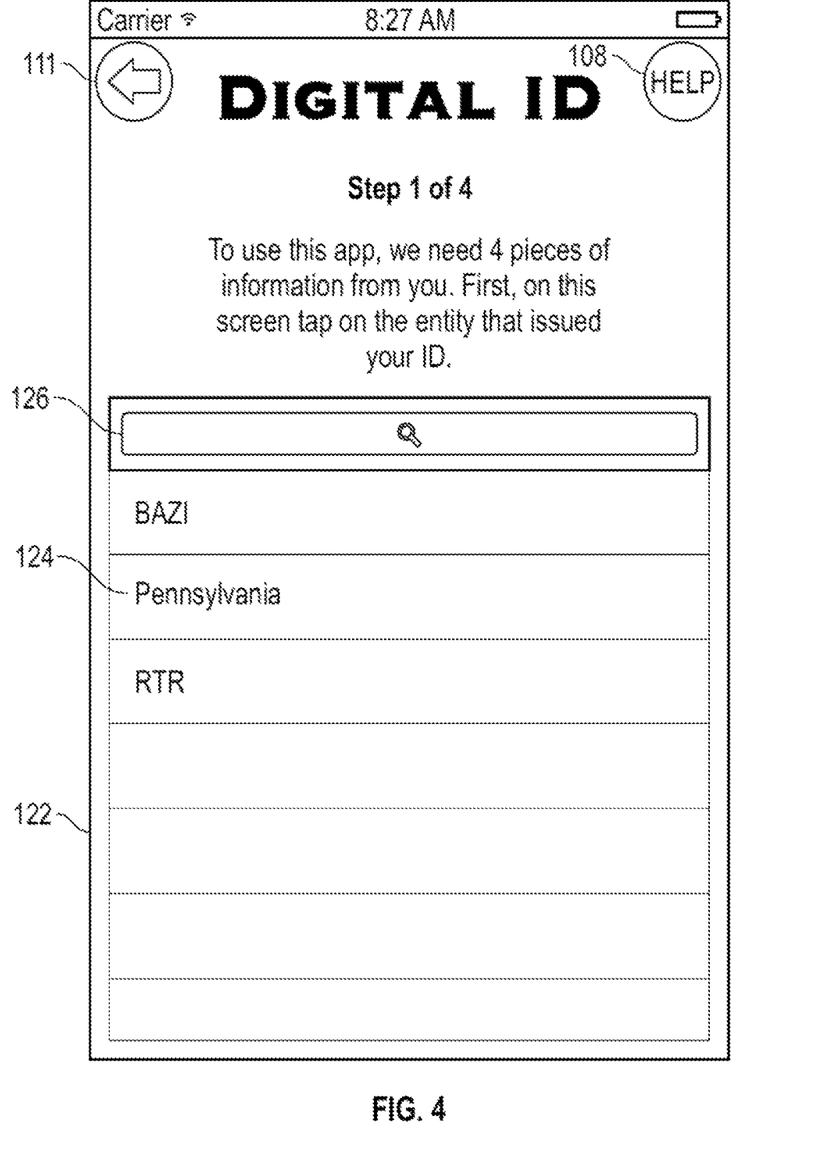
FIG. 4 is an exemplary GUI of a new user setup for the system of FIG. 1.

When user 50 presses "New User" button 109, an exemplary GUI 122, shown in FIG. 4, is displayed. GUI 122 still displays "Help" button 108. In addition, a "Back arrow" button 111 is displayed that allows user 50 to go back to GUI 105. GUI 122 also displays a list 124 of available identification issuing entities that can be selected. If the desired name of issuer 112 is not displayed in list 124, an input box 126 is provided to allow user 50 to type in the name of issuer 112.

Figure 5:
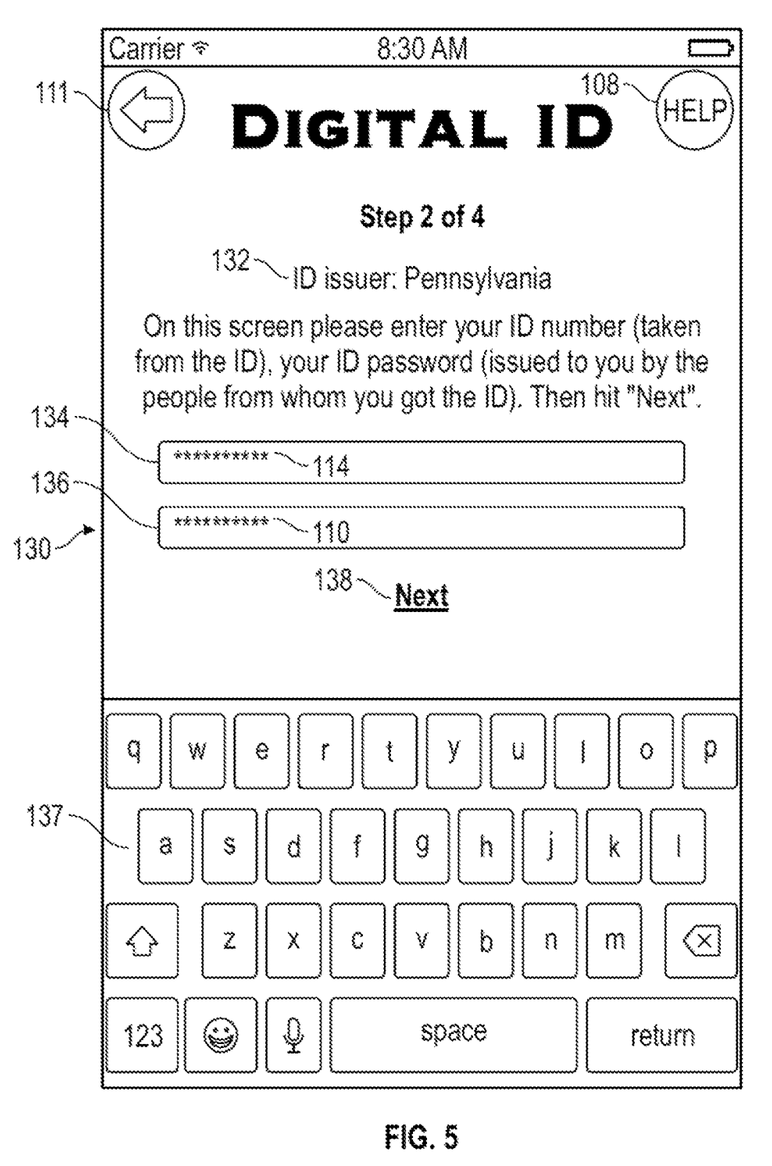
FIG. 5 is an exemplary GUI showing the next step of a user setup for the system of FIG. 1.

When user 50 selects the desired issuer 112, an exemplary GUI 130, shown in FIG. 5, is displayed. GUI 122 displays "Help" button 108 and "Back arrow" button 111. A listing of the selected issuer 112 is displayed at "ID issuer" location 132. A first input block 134 requires user 50 to input identification number 114 associated with issuer 112 and a second input block 136 requires user 50 to input password 110 associated with identification number 114. An alphanumeric keyboard 137 is provided to allow user 50 to input identification number 114 and password 110. After user 50 inputs both identification number 114 and password 110, user 50 presses a "Next" button 138, which generates an exemplary GUI 140, shown in FIG. 6.

Figure 6:
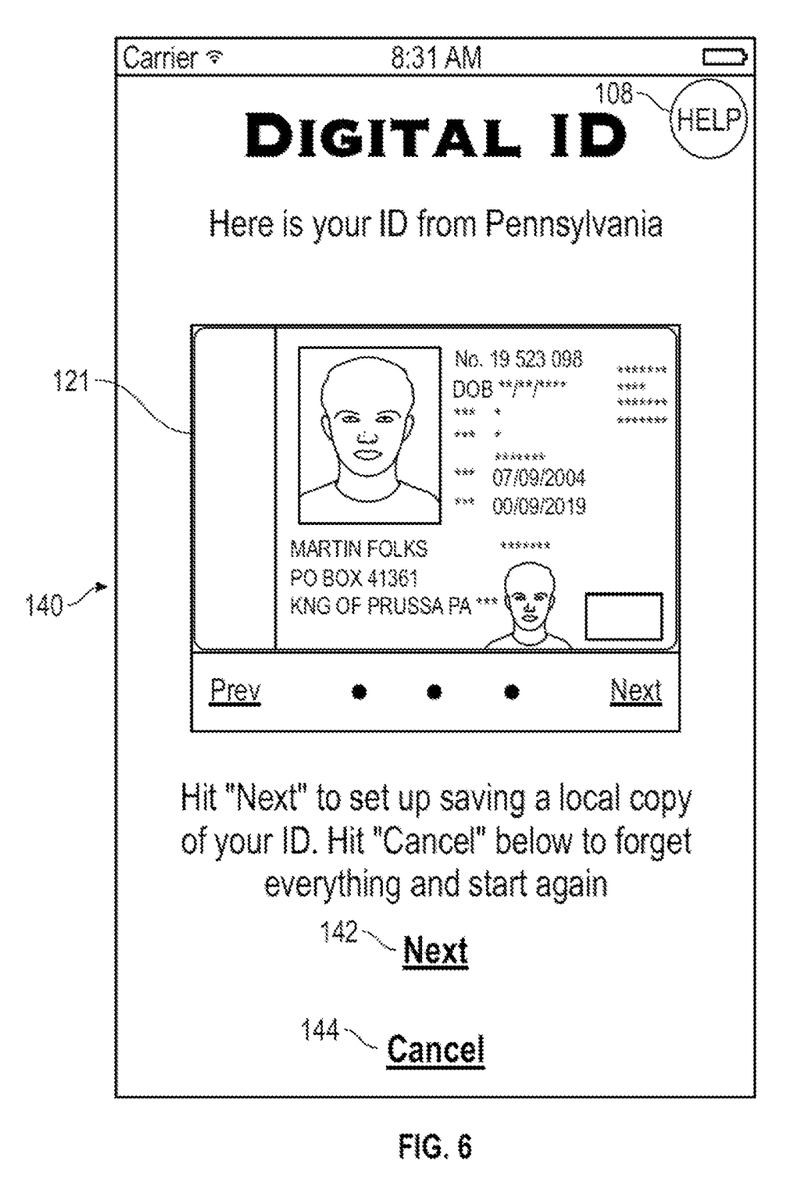
FIG. 6 is an exemplary GUI showing confirmation of a user setup for the system of FIG. 1.
Figure 7:
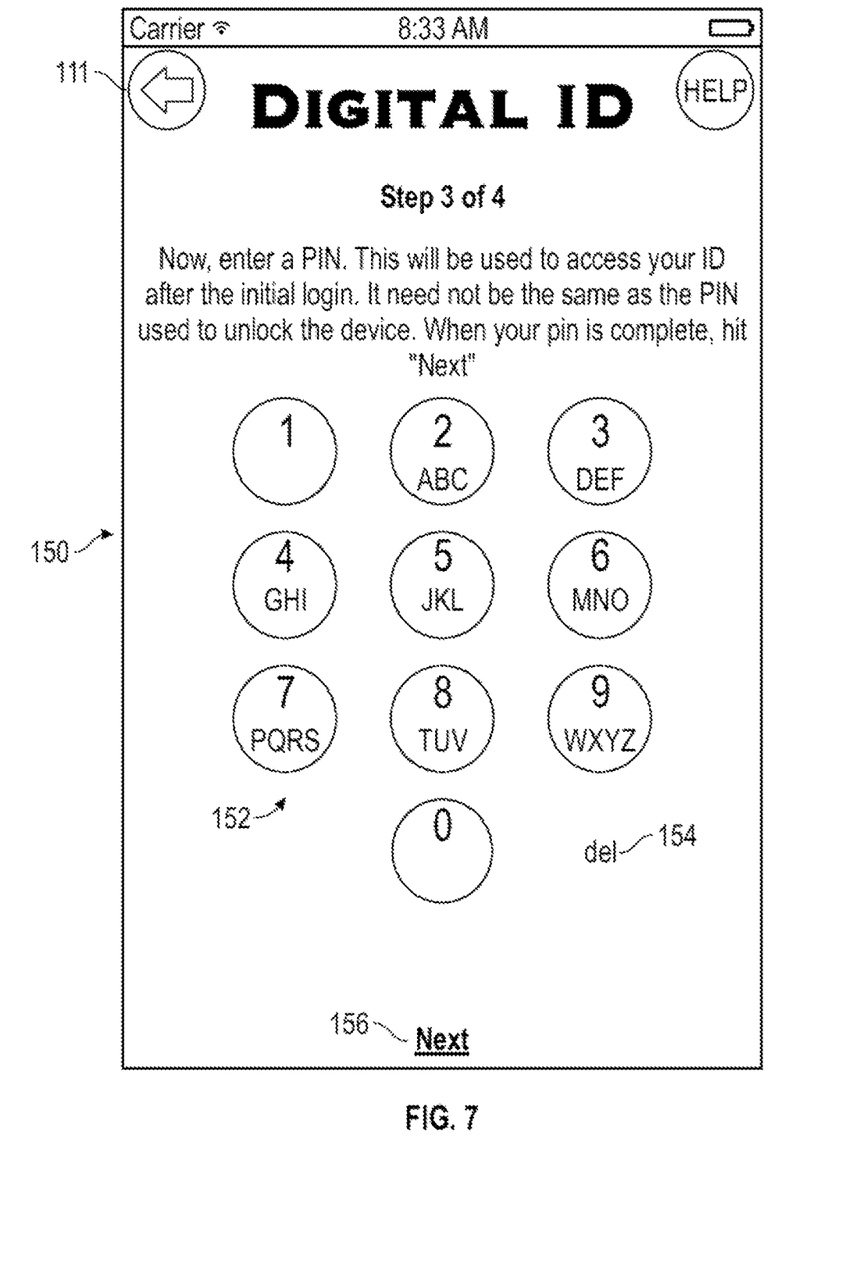
FIG. 7 is an exemplary GUI allowing a user to enter a PIN for use of the system of FIG. 1.

GUI 140 displays photo 121 provided by issuer 112. A "Next" button 142 can be pressed to save a local copy of the user's ID to app 102 and move to GUI 150, shown in FIG. 7. A "Cancel" button 144 on GUI 140 can be pressed to cancel out of app 102.

Figure 8:
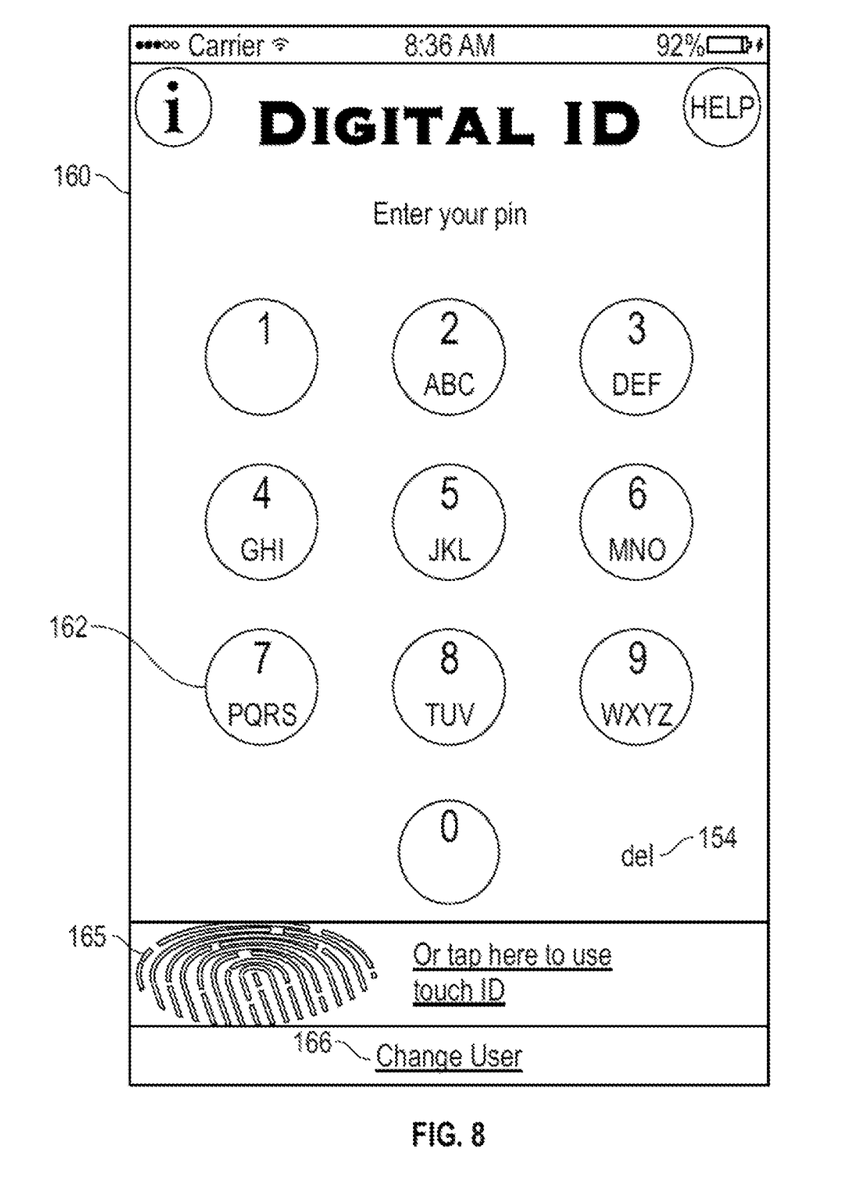
FIG. 8 is an exemplary GUI for a user to access the system of FIG. 1.

When the user 50 wants to use system 100, the user 50 selects the first app for system 100 from their device 101, which generates the GUI 160 shown in FIG. 8. GUI 160 allows the user to input a Personal Identification Number ("PIN") with a numeric keypad 152. A "del" (Delete) button 164 is provided to allow the user to delete the previously inputted number in the event of an input error. Alternatively, if their electronic device is equipped with fingerprint recognition, a fingerprint button 165 can be tapped to access their saved identifications.

A "Change User" button 166 can be pressed to change users, which allows another person to input their ID into system 100.

Figure 9:
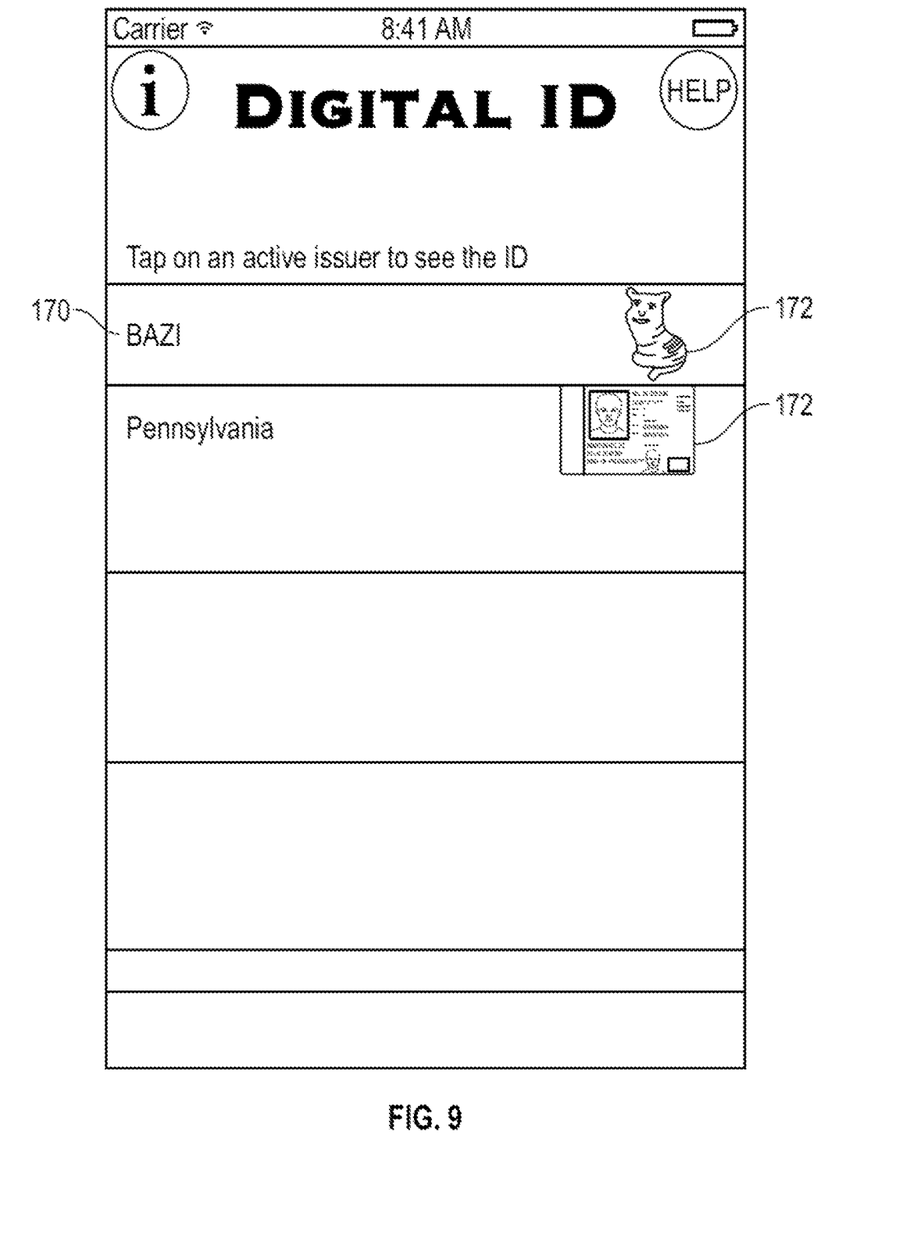
FIG. 9 is an exemplary GUI for a user to select a desired identification issuer for use with the system of FIG. 1.

When the user 50 inputs the correct PIN or uses the fingerprint recognition, GUI 170, shown in FIG. 9, is generated. GUI 170 shows a list of all ID's 172 that the user 50 has previously input into system 100. The user 50 taps on the desired ID, generating GUI 180, shown in FIG. 10. QR code 182 is generated, and the user 50 shows the QR code 182 to a QR code reader 190 in the DV (second) app that is electronically tied to the first app, which scans the QR code and validates the identity of the user 50.

Figure 10:
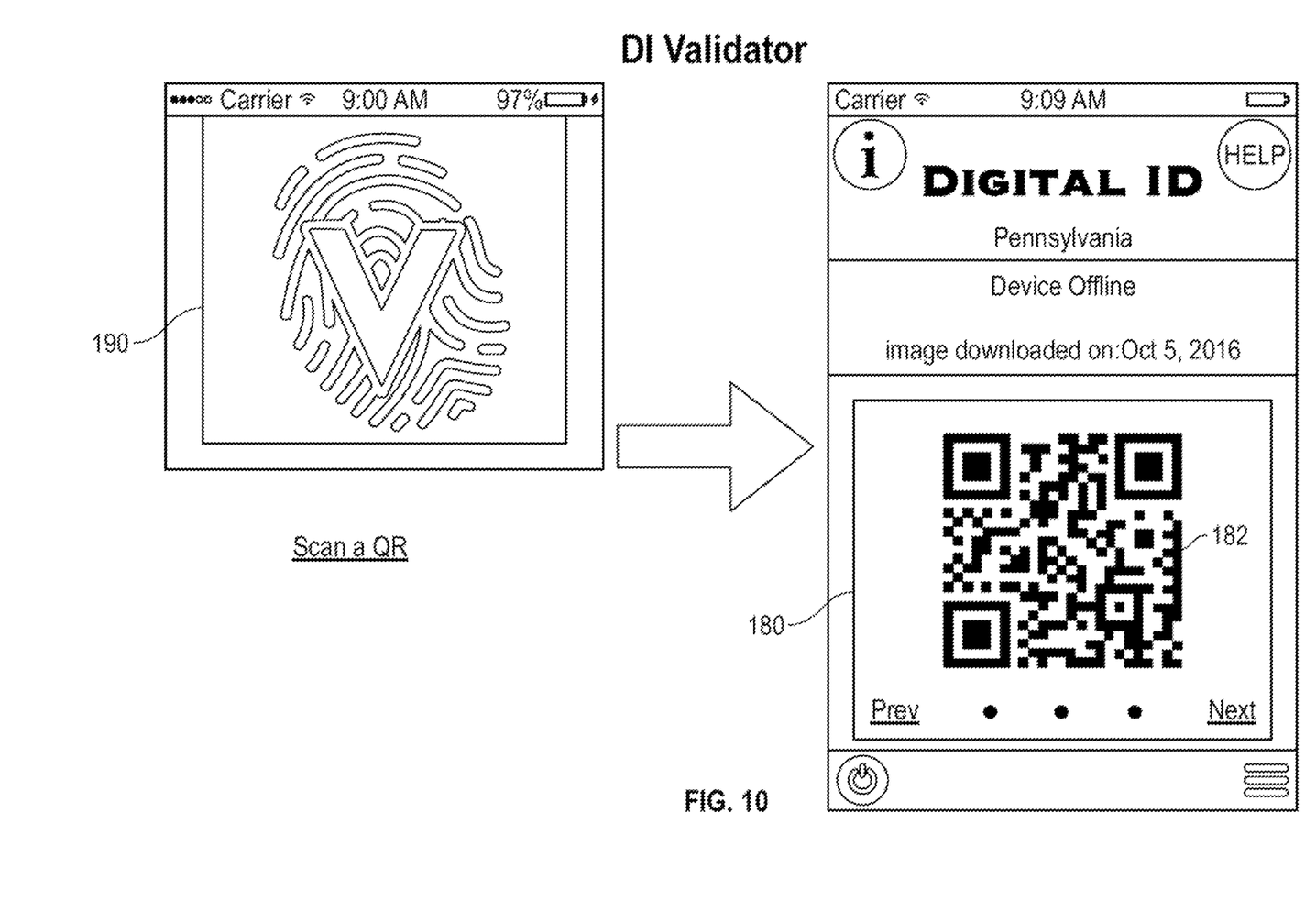
FIG. 10 shows a QR code generated by the system of FIG. 1 being validated.

If user 50 is at a location with no wireless signal that cannot download the most recent QR code, such as, for example, if the user's device is in "airplane mode" or the user is in a location with no Wi-Fi capability, app 102 retrieves the most recent QR code associated with user 50 for use. Issuer 112 can determine how the most recent QR code can be used. For example, the most recent QR code can be stored for a predetermined amount of time such as, for example, four minutes.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A non-transitory machine-readable storage medium, having encoded thereon program code, wherein, when the program code is executed by a machine, the machine implements a method for validating the identification of a person, the method comprising the steps of:

(a) receiving a temporary password from an identification-issuing entity from a first application;
(b) receiving an input of an identification number provided by the identification-issuing entity;
(c) displaying a picture of an identification card issued by the identification-issuing entity; and
(d) saving a local copy of the picture to the first application.

2. The non-transitory machine-readable storage medium according to claim 1, further comprising the step of, after step (d), the step of:
(e) receiving an input of the identification-issuing entity.

3. The non-transitory machine-readable storage medium according to claim 2, further comprising, after step (e), the step of:
(f) generating a machine-readable code.

4. The non-transitory machine-readable storage medium according to claim 3, further comprising, after step (f), the step of:
(g) receiving an input of the machine-readable code from a second application.

5. The non-transitory machine-readable storage medium according to claim 4, further comprising, after step (g), the step of:
(h) validating the identification card.

6. The non-transitory machine-readable storage medium according to claim 1, wherein step (c) comprises displaying a photo.

7. A method for validating the identification of a person, the method comprising the steps of:
(a) receiving a temporary password from an identification-issuing entity from a first application;
(b) receiving an input of an identification number provided by the identification-issuing entity;
(c) displaying a picture of an identification card issued by the identification-issuing entity; and
(d) saving a local copy of the picture to the first application.

8. The method according to claim 7, further comprising the step of, after step (d), the step of:
(e) receiving an input of the identification-issuing entity.

9. The method according to claim 8, further comprising, after step (e), the step of:
(f) generating a machine-readable code.

10. The method according to claim 9, further comprising, after step (f), the step of:
(g) receiving an input of the machine-readable code from a second application.

11. The method according to claim 10, further comprising, after step (g), the step of:
(h) validating the identification card.

12. The method according to claim 7, wherein step (c) comprises displaying a photo.

* * * * *